US012023785B2

(12) United States Patent
Cacciabeve

(10) Patent No.: US 12,023,785 B2
(45) Date of Patent: Jul. 2, 2024

(54) FLEXIBLE MAGNETIC WRENCH HOLDER

(71) Applicant: Walter R. Tucker Enterprises, Ltd., Deposit, NY (US)

(72) Inventor: Robert Cacciabeve, Boonton, NJ (US)

(73) Assignee: Walter R. Tucker Enterprises, Ltd., Deposit, NY (US)

( * ) Notice: Subject to any disclaimer, the term of this patent is extended or adjusted under 35 U.S.C. 154(b) by 0 days.

(21) Appl. No.: 17/950,669

(22) Filed: Sep. 22, 2022

(65) Prior Publication Data

US 2023/0013699 A1 Jan. 19, 2023

Related U.S. Application Data

(63) Continuation-in-part of application No. 17/237,414, filed on Apr. 22, 2021, now Pat. No. 11,504,843.

(60) Provisional application No. 63/302,690, filed on Jan. 25, 2022, provisional application No. 63/248,061, filed on Sep. 24, 2021.

(51) Int. Cl.
*B25B 13/56* (2006.01)
*B25H 3/00* (2006.01)

(52) U.S. Cl.
CPC ............... *B25B 13/56* (2013.01); *B25H 3/00* (2013.01)

(58) Field of Classification Search
CPC . B25H 3/003; B25H 3/04; B25H 3/06; B25H 1/0071
USPC ............ 211/70.6, DIG. 1, 13.1, 69; 206/350, 206/818, 493, 376; 248/309.4, 206.5, 248/311.2
See application file for complete search history.

(56) References Cited

U.S. PATENT DOCUMENTS

| | | | | | |
|---|---|---|---|---|---|
| 2,597,601 | A * | 5/1952 | Sherman | A42B 1/24 | 224/183 |
| 3,405,377 | A * | 10/1968 | Pierce | B25H 3/003 | 206/378 |
| 4,183,439 | A * | 1/1980 | Bell | A47G 21/14 | 211/DIG. 1 |
| 4,321,999 | A * | 3/1982 | Higgins | A61B 50/20 | 206/370 |
| 4,544,067 | A * | 10/1985 | Miller | B25H 3/04 | 211/DIG. 1 |
| 4,826,059 | A * | 5/1989 | Bosch | A45C 11/24 | 211/DIG. 1 |
| 5,080,230 | A * | 1/1992 | Winnard | B25H 3/06 | 211/DIG. 1 |
| 5,301,822 | A * | 4/1994 | Coleman | B25H 3/04 | 211/DIG. 1 |

(Continued)

*Primary Examiner* — Steven A. Reynolds
*Assistant Examiner* — Prince Pal
(74) *Attorney, Agent, or Firm* — Breiner & Breiner, L.L.C.

(57) ABSTRACT

A flexible magnetic wrench holder is disclosed having a flexible elongated strip having a top wall, a bottom wall, a first side wall and a second side wall. The top wall has a plurality of stations each adapted to receive a wrench. The bottom wall includes a magnet retainer assembly in each station having a first magnet and a second magnet. The top wall of the flexible elongated strip is adapted to magnetically hold a wrench at each station with the first magnet and the bottom wall of the flexible elongated strip is adapted to magnetically attach to different shaped ferrous surfaces with the second magnet. Alternatively, the top wall may include a plurality of flexible tabs for holding the wrenches by mechanical hold and friction fit. The holder may be flexed and twisted.

17 Claims, 17 Drawing Sheets

(56) References Cited

U.S. PATENT DOCUMENTS

| | | | | | |
|---|---|---|---|---|---|
| 5,316,143 | A * | 5/1994 | Horn | B25H 3/06 | 211/DIG. 1 |
| 5,456,359 | A * | 10/1995 | Horn | B25H 3/06 | 211/DIG. 1 |
| 5,544,747 | A * | 8/1996 | Horn | B25H 3/06 | 211/DIG. 1 |
| 5,669,516 | A * | 9/1997 | Horn | B25H 3/06 | 211/DIG. 1 |
| 5,699,910 | A * | 12/1997 | Kubat | B25H 3/06 | 206/373 |
| 5,743,394 | A * | 4/1998 | Martin | B25H 3/003 | 211/DIG. 1 |
| 5,855,285 | A * | 1/1999 | Laird | B25H 3/003 | 206/378 |
| 5,919,541 | A * | 7/1999 | Emory | B32B 3/08 | 211/DIG. 1 |
| 6,145,676 | A * | 11/2000 | Gross | B25H 3/04 | 211/70.6 |
| 6,168,018 | B1 * | 1/2001 | Ramsey | B25H 3/06 | 206/378 |
| 6,267,277 | B1 * | 7/2001 | Taylor | B25H 3/04 | 224/183 |
| 6,494,329 | B1 * | 12/2002 | Dembicks | B25H 3/003 | 206/378 |
| 6,530,508 | B1 * | 3/2003 | Devine | A45F 5/00 | 224/267 |
| 6,571,966 | B1 * | 6/2003 | Hsiao | A47F 7/0028 | 206/379 |
| 6,587,022 | B1 * | 7/2003 | Devine | A45F 5/00 | 211/DIG. 1 |
| 6,719,155 | B1 * | 4/2004 | Chang | B25H 3/04 | 211/DIG. 1 |
| 6,811,127 | B1 * | 11/2004 | Shiao | B25H 3/04 | 211/DIG. 1 |
| 6,923,317 | B2 * | 8/2005 | Coleman, Jr. | B25H 3/003 | 206/378 |
| 7,172,079 | B1 * | 2/2007 | Shiao | B25H 3/04 | 206/379 |
| 7,310,035 | B2 * | 12/2007 | Wooten | H01F 7/0252 | 335/302 |
| 7,905,354 | B1 * | 3/2011 | Geibel | B25H 3/06 | 206/378 |
| 8,181,780 | B1 * | 5/2012 | Guffey | B25H 3/06 | 206/378 |
| 8,272,628 | B2 * | 9/2012 | Winnard | B25H 3/06 | 269/6 |
| 8,967,562 | B1 * | 3/2015 | Bileth | F16M 13/022 | 248/311.2 |
| 9,126,329 | B2 * | 9/2015 | Kao | F16M 13/022 | |
| 9,205,552 | B2 * | 12/2015 | Kao | F16M 13/022 | |
| 10,052,754 | B1 * | 8/2018 | Coleman, Jr. | B25H 3/04 | |
| 10,125,542 | B1 * | 11/2018 | Wandschneider | E06C 7/14 | |
| 10,207,401 | B1 * | 2/2019 | Pedrin | B25H 3/003 | |
| 10,413,092 | B2 * | 9/2019 | Winnard | A47F 5/0823 | |
| 10,842,264 | B1 * | 11/2020 | Savryha | A47B 47/0091 | |
| 11,319,717 | B1 * | 5/2022 | Kukuruda | B05B 12/20 | |
| 11,504,843 | B2 * | 11/2022 | Cacciabeve | B25H 3/003 | |
| 2003/0079581 | A1 * | 5/2003 | Beauchamp | B25F 5/029 | 81/490 |
| 2004/0173484 | A1 * | 9/2004 | Bates | B25H 3/04 | 206/349 |
| 2004/0238466 | A1 * | 12/2004 | Shiao | B25H 3/04 | 211/DIG. 1 |
| 2005/0247585 | A1 * | 11/2005 | Breckwoldt | B25H 3/006 | 206/350 |
| 2006/0016841 | A1 * | 1/2006 | Shurm | B25H 3/00 | 224/222 |
| 2009/0152150 | A1 * | 6/2009 | Kernodle, Jr. | B25H 3/003 | 206/379 |
| 2011/0303808 | A1 * | 12/2011 | Bileth | A47G 23/0266 | 248/311.2 |
| 2013/0068709 | A1 * | 3/2013 | Liu | B25H 3/04 | 211/70.6 |
| 2015/0122750 | A1 * | 5/2015 | Kao | B25H 3/003 | 211/13.1 |
| 2016/0031074 | A1 * | 2/2016 | Su | B25H 3/003 | 206/349 |
| 2016/0243695 | A1 * | 8/2016 | Billups, Jr. | B25H 3/003 | |
| 2018/0104812 | A1 * | 4/2018 | Wacker | F16B 1/00 | |
| 2018/0343991 | A1 * | 12/2018 | Olson | B25B 23/12 | |
| 2019/0015966 | A1 * | 1/2019 | Nordness | B25H 3/003 | |
| 2019/0070723 | A1 * | 3/2019 | Billups, Jr. | B25H 3/003 | |
| 2019/0084146 | A1 * | 3/2019 | Boltryk | B25H 3/003 | |
| 2019/0283233 | A1 * | 9/2019 | Kukucka | B25H 3/06 | |
| 2020/0094396 | A1 * | 3/2020 | Steiner | B25H 3/003 | |
| 2020/0122315 | A1 * | 4/2020 | Hurley | B25H 3/04 | |
| 2020/0180138 | A1 * | 6/2020 | D'Alessandro | B25H 3/00 | |
| 2020/0238501 | A1 * | 7/2020 | Baum | B25H 3/003 | |
| 2020/0306950 | A1 * | 10/2020 | Chang | B25H 3/04 | |
| 2021/0039245 | A1 * | 2/2021 | Kukucka | B25H 3/003 | |
| 2022/0080576 | A1 * | 3/2022 | Chen | B25H 3/003 | |
| 2022/0347833 | A1 * | 11/2022 | Hurley | B25H 3/04 | |
| 2022/0361652 | A1 * | 11/2022 | Stutz | A44B 99/00 | |
| 2022/0379460 | A1 * | 12/2022 | Wong | B25H 3/003 | |
| 2023/0158660 | A1 * | 5/2023 | Schneider | B25H 3/04 | 211/70.6 |

* cited by examiner

FIG. 5
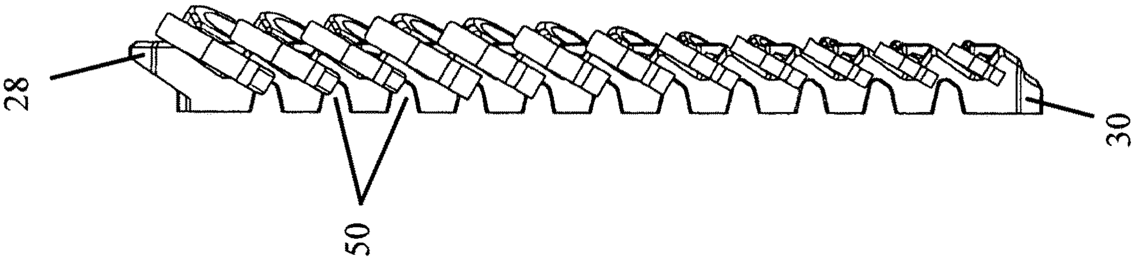
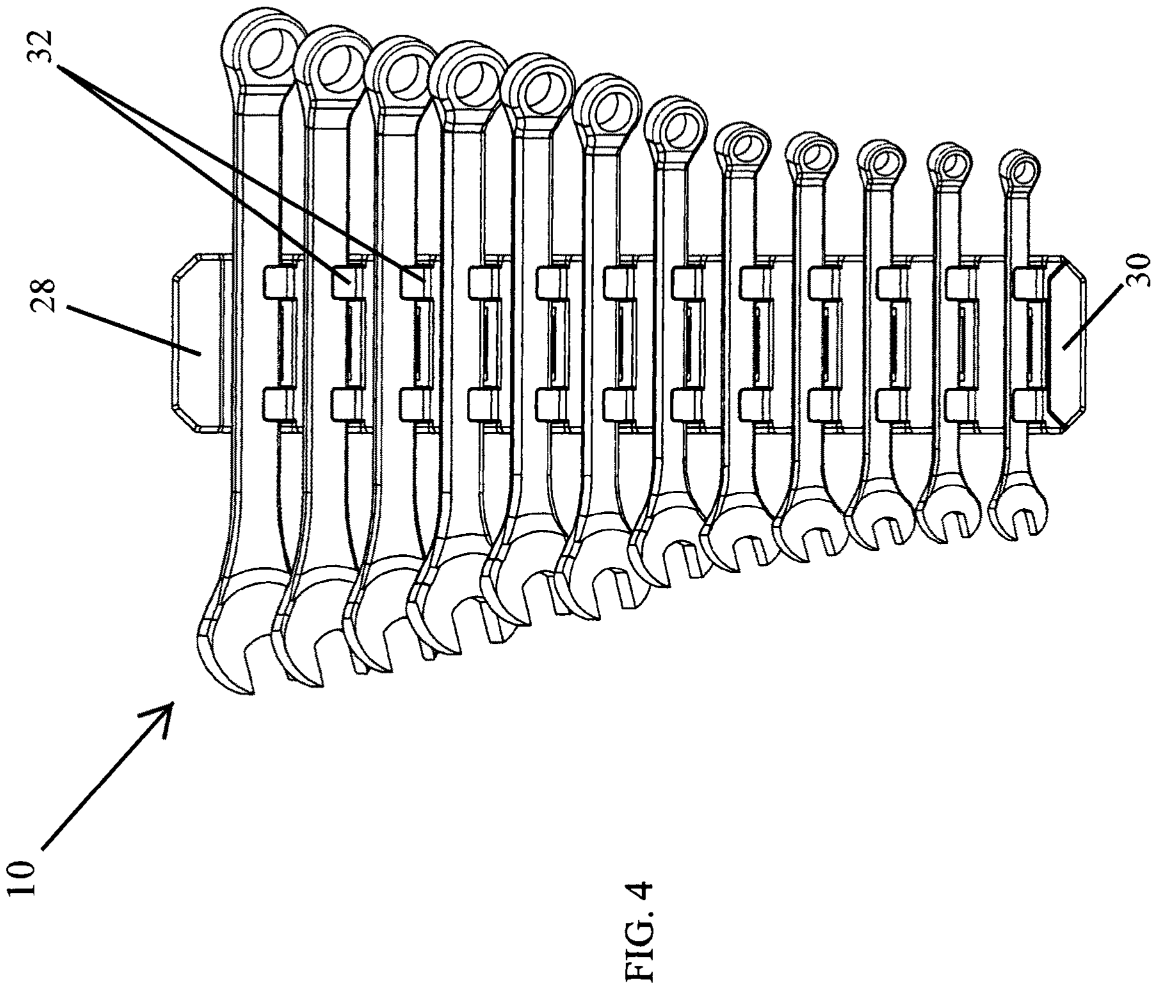
FIG. 4

FIG. 11
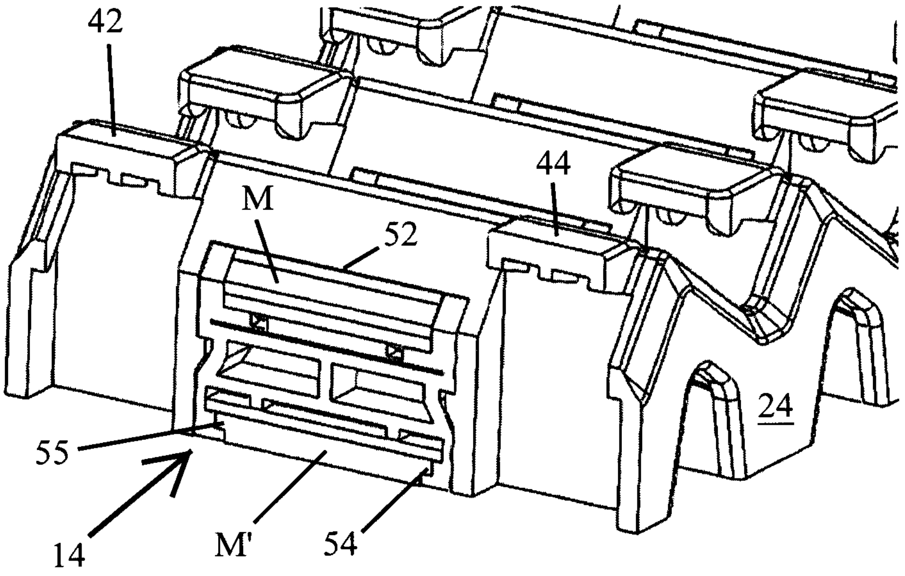
Cross section through magnet/retainer assembly
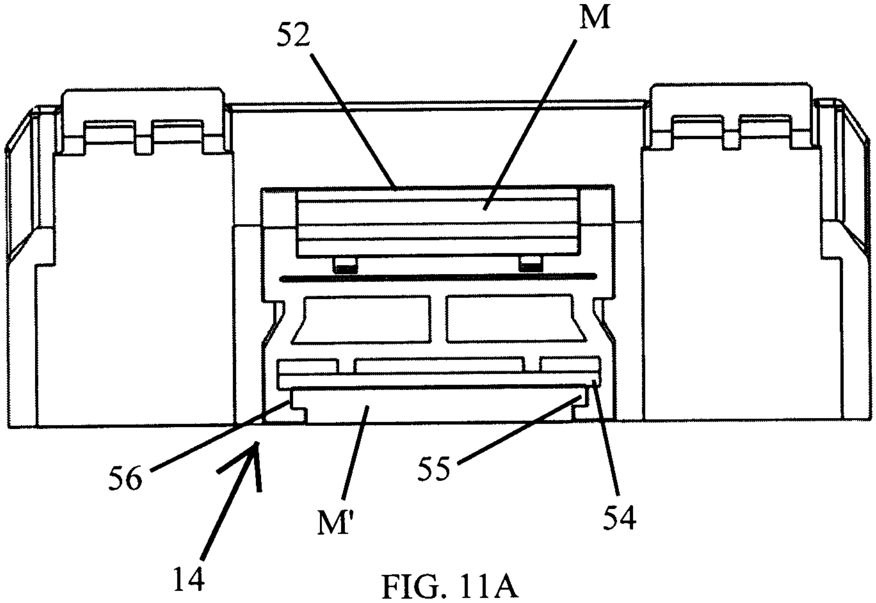
FIG. 11A FIG. 22
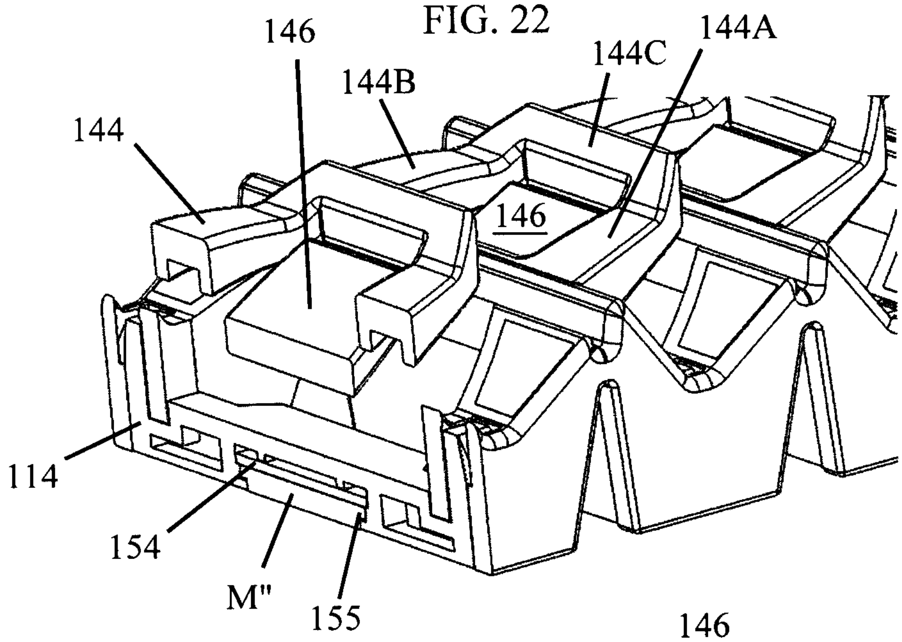
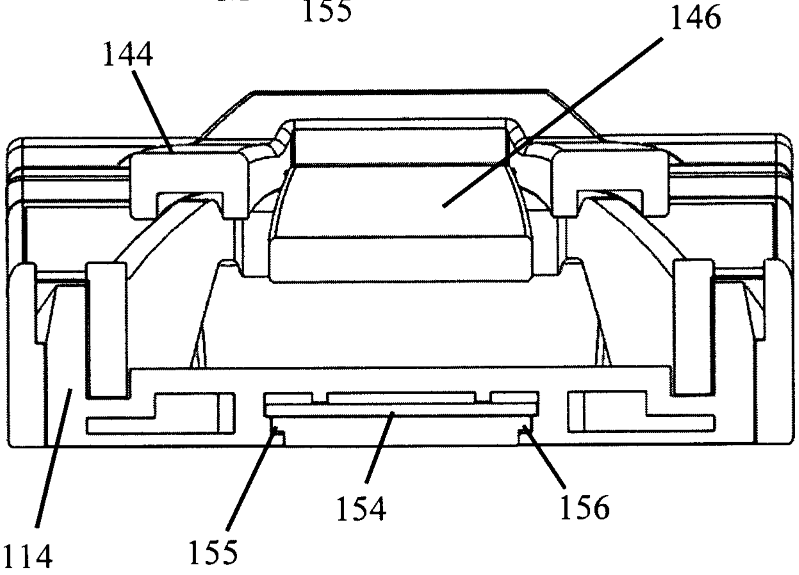
FIG. 22A

FLEXIBLE MAGNETIC WRENCH HOLDER

RELATED APPLICATIONS

This application claims benefit of Provisional Application Ser. No. 63/302,690, entitled "Flexible Magnetic Wrench Holder," filed Jan. 25, 2022 and Provisional Application Ser. No. 63/248,061, entitled "Flexible Magnetic Wrench Holder," filed Sep. 24, 2021, and is a continuation-in-part of U.S. application Ser. No. 17/237,414, entitled "Flexible Magnetic Socket Holder," filed Apr. 22, 2021, which applications are incorporated herein in their entirety by reference.

FIELD OF THE INVENTION

The present invention relates to a wrench holder. More particularly, a first embodiment of the invention relates to a flexible magnetic wrench holder wherein a first series of magnets will hold the wrenches on the holder, the holder is flexible and a second series of magnets will attach the holder to almost any shape ferrous surface; and a second embodiment of the invention relates to a flexible magnetic wrench holder wherein the top of the wrench holder includes a series of flexible tabs to hold the wrenches and the bottom of the wrench holder includes a series of magnets which will attach the holder to almost any shape ferrous surface.

BACKGROUND OF THE INVENTION

Wrenches are used in numerous applications, including in automotive garages. Preferably, the wrenches should be maintainable in a holder for storage when not in use and the holder is preferably transportable to the environment of use. A worker may then remove the required size wrench for the work. The different size wrenches should be maintained by size for ease of selection and use by the worker. The art is replete with different devices for holding wrenches, including, for example, wrench holders such as disclosed in U.S. Pat. No. D837,625.

The invention is related to applicant's line of flexible magnetic tools, including its magnetic flexible socket holder disclosed in U.S. patent application Ser. No. 17/237,414 as referenced above.

These known devices, while useful, have various shortcomings, including that the wrenches may fall out of or off of a wrench holder and are not conducive to use in tight workspaces. These and other shortcomings of these devices are addressed by the present invention.

SUMMARY OF THE INVENTION

A first embodiment of the invention is directed to a wrench holder. The wrench holder includes an elongated strip made of a flexible material such as a thermoplastic rubber (TPR) or silicone. There are a plurality of stations on the wrench holder in which a wrench is placed and held. There are a first series of magnets, one at the top of each station, to hold a wrench, and a second series of magnets, one under each station, for attachment to a ferrous surface. The first series of magnets are preferably exposed at the top of the strip and allow the wrenches to be attached to the strip. The second series of magnets are preferably exposed at the bottom of the elongated strip and allow the strip through the magnets to grip any shape/arc/angled ferrous surface.

Features and benefits of this first embodiment of the invention include, but are not limited to, the following: (1) the flexibility of the elongated strip with the magnets; (2) each of the first series of magnets is preferably exposed at the top of the strip for engaging and holding the wrench and each of the second series of magnets is preferably exposed at the bottom of the strip for attachment to a ferrous surface; and (3) because the device is flexible, it may be flexed and/or twisted to attach the holder to almost any ferrous surface, including a car wheel well, or over an arc, or over an angled shaped object.

This first embodiment of the invention is directed to a flexible magnetic wrench holder comprising a flexible elongated strip having a plurality of stations for holding a wrench. Each station includes a first series of magnets at the top of the strip for holding a wrench and a second series of magnets at the bottom of the strip for engaging a ferrous surface to attach the strip on the surface. The strip is flexible allowing it to bend and engage numerous different shaped ferrous surfaces.

A second embodiment of the invention is directed to a wrench holder. The wrench holder includes an elongated strip made of a flexible material such as a thermoplastic rubber (TPR) or silicone. There are a plurality of stations on the wrench holder in which a wrench is placed and held. There are a plurality of flexible tabs, one at the top of each station, to hold a wrench, and a series of magnets, one under each station, for attachment to a ferrous surface. The flexible tabs are at the top of the strip and allow the wrenches to be attached to the strip by mechanical hold and friction. The series of magnets are preferably exposed at the bottom of the elongated strip and allow the strip through the magnets to grip any shape/arc/angled ferrous surface.

Features and benefits of this second embodiment of the invention include, but are not limited to, the following: (1) the flexibility of the elongated strip; (2) each of the flexible tabs at the top of the strip for engaging and holding the wrench and each of the series of magnets is preferably exposed at the bottom of the strip for attachment to a ferrous surface; and (3) because the device is flexible, it may be flexed and/or twisted to attach the holder to almost any ferrous surface, including a car wheel well, or over an arc, or over an angled shaped object.

This second embodiment of the invention is directed to a flexible magnetic wrench holder comprising a flexible elongated strip having a plurality of stations for holding a wrench. Each station includes a flexible tab at the top of the strip for holding a wrench and a series of magnets at the bottom of the strip for engaging a ferrous surface to attach the strip on the surface. The strip is flexible allowing it to bend and engage numerous different shaped ferrous surfaces.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 4 is a top view of the wrench holder of FIG. 1.

FIG. 5 is a side view of the wrench holder of FIG. 1.

FIG. 11 shows the elongated strip of FIG. 10 with the plastic magnet retainer assembly in place.

FIG. 11A is a cross-section through the magnetic retainer assembly of FIG. 11.

FIG. 22 shows the elongated strip of FIG. 21 with the plastic magnet retainer assembly in place.

FIG. 22A is a cross-section through the magnetic retainer assembly of FIG. 21.

DETAILED DESCRIPTION OF THE PREFERRED EMBODIMENTS

A first embodiment of the invention is directed to a wrench holder for holding wrenches as shown in FIGS. 1-11. The wrench holder is made of a flexible material such as thermoplastic rubber (TPR) or silicone and having a structure such that the wrench holder may flex and bend for attachment of the wrench holder to almost any shape article. The wrench holder includes a first series of magnets which will hold the wrenches to the top of the wrench holder and a second series of magnets which allow the bottom of the wrench holder to magnetically adhere to different shaped ferrous objects, e.g. an automobile wheel well, the underside of an automobile hood, a work area or any other article. The wrench holder may be made of different sizes for holding different size wrenches. The figures show a presently preferred embodiment of the wrench holder for holding twelve different size wrenches. The invention will be described in further detail below.

Figure 1:
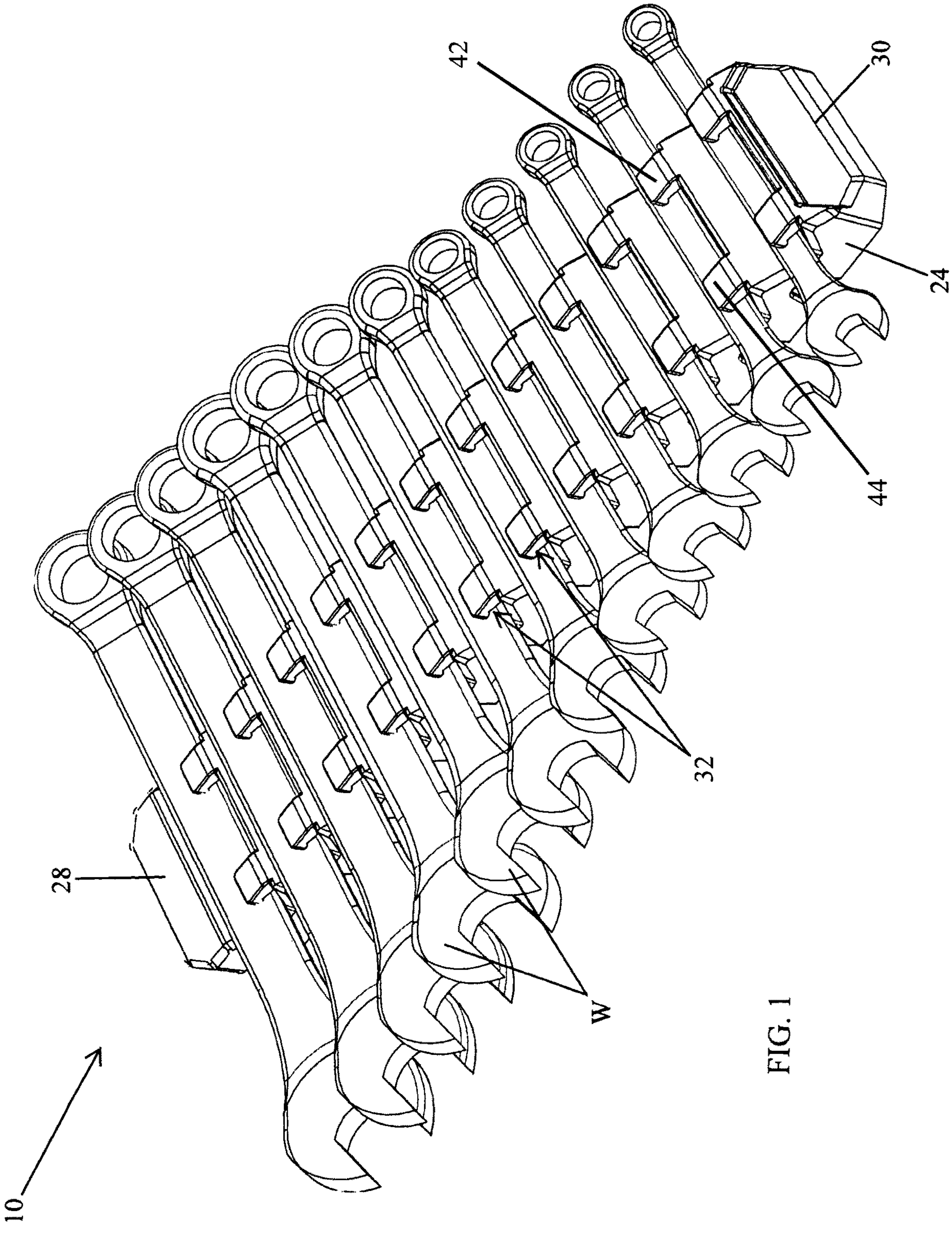
FIG. 1 is a perspective view of a first embodiment of the flexible magnetic wrench holder of the invention holding a plurality of wrenches.
Figure 2:
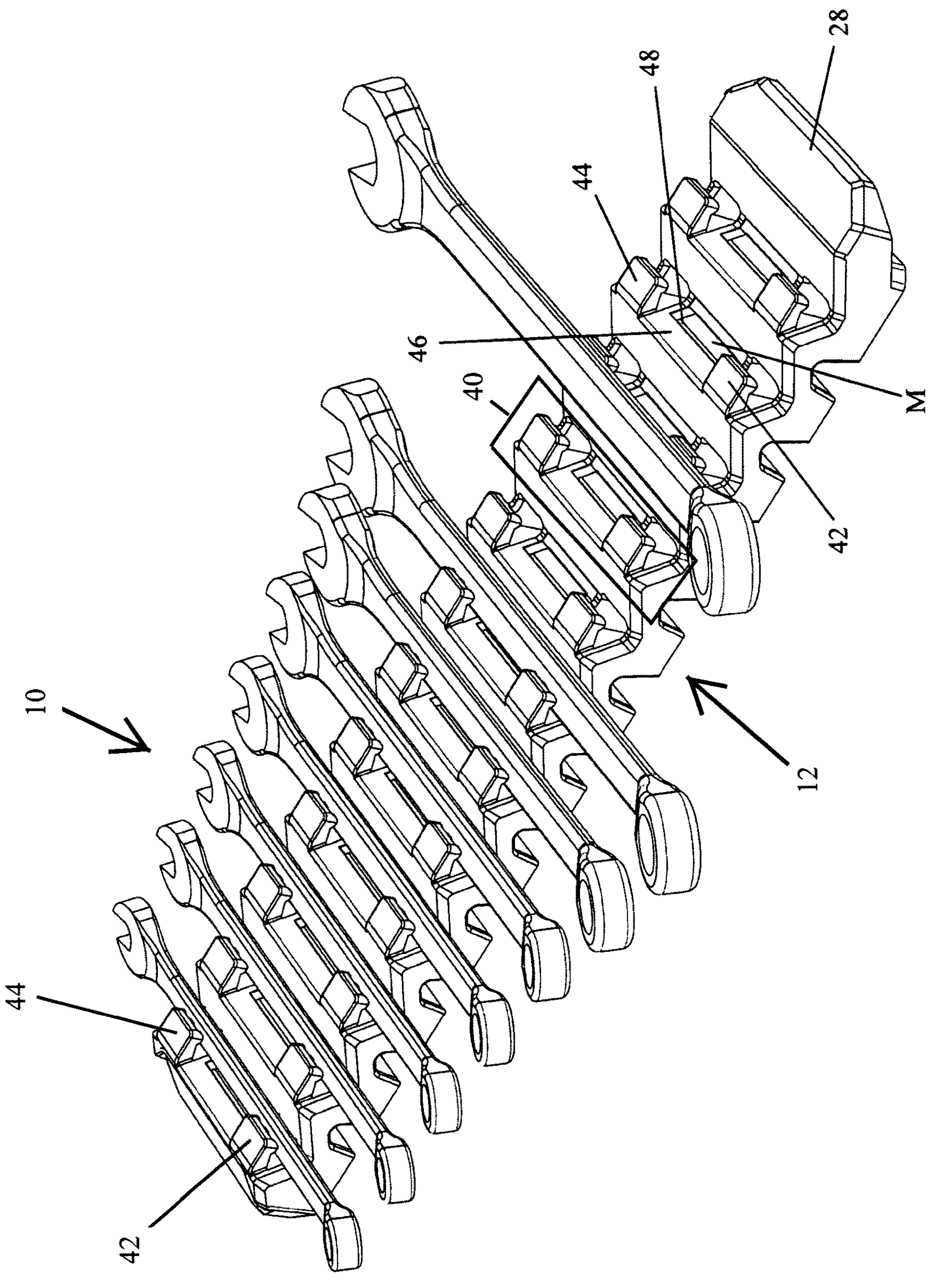
FIG. 2 is another perspective view of the wrench holder of FIG. 1 with some of the wrenches removed.
Figure 3:
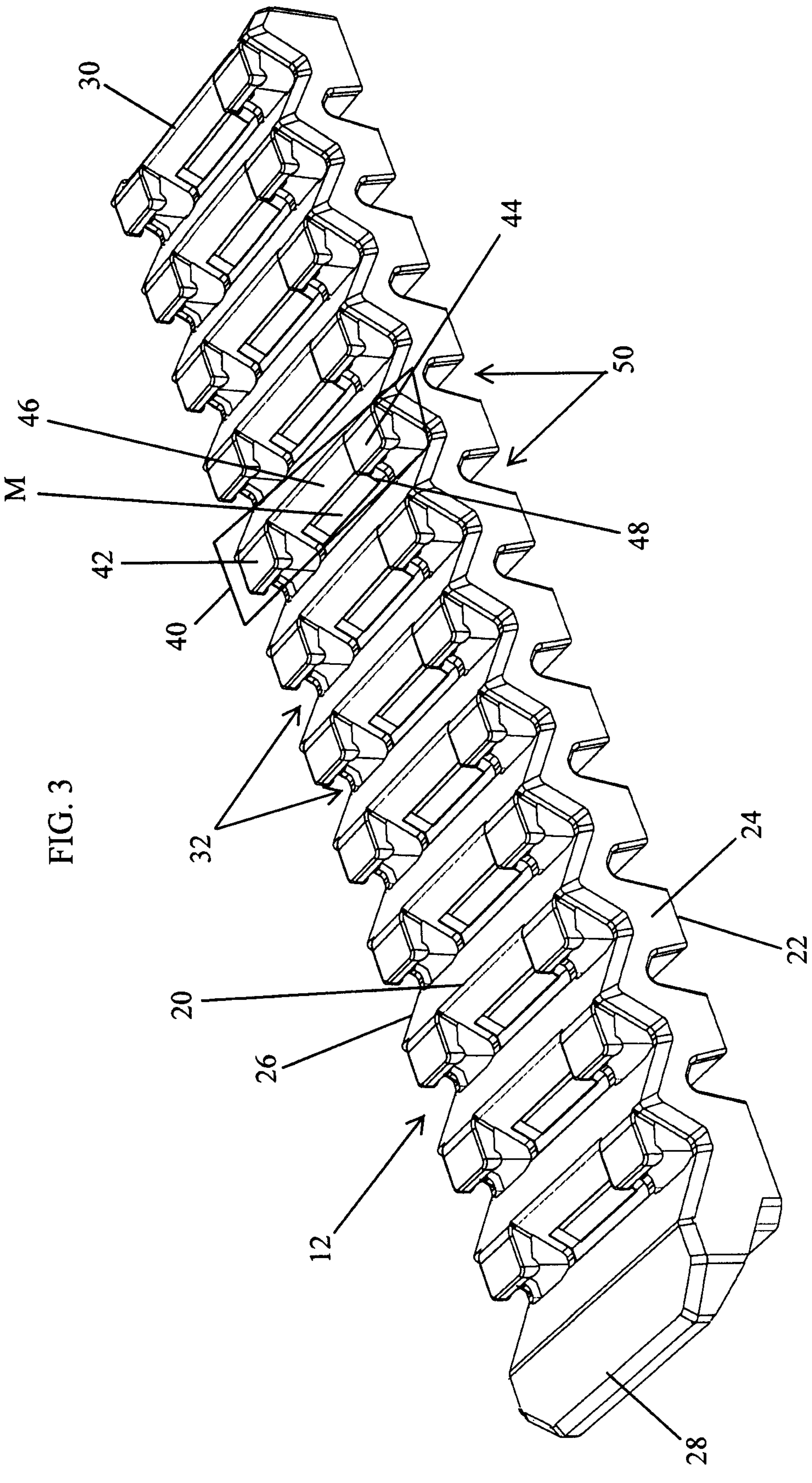
FIG. 3 is a perspective view of the wrench holder of FIG. 1 with all of the wrenches removed.
Figure 6:
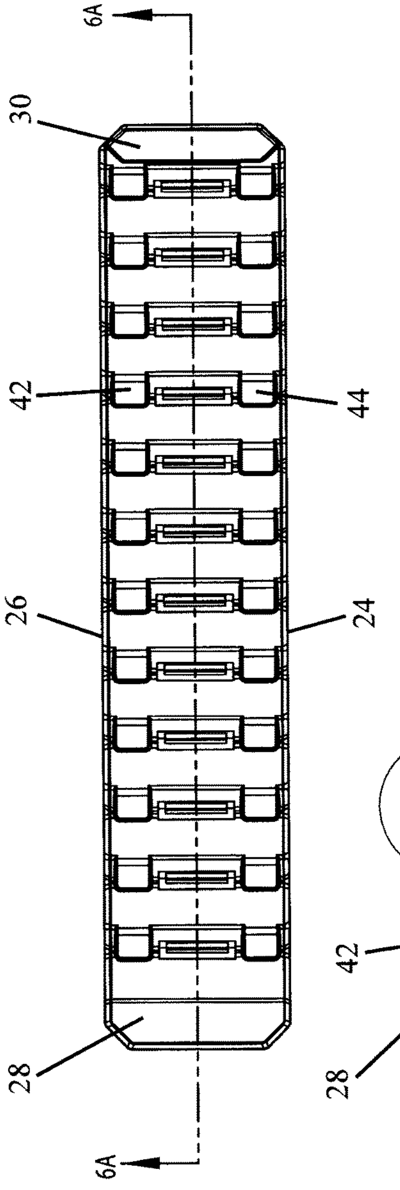
FIG. 6 is a top view of the wrench holder of FIG. 3.
Figure 6A:
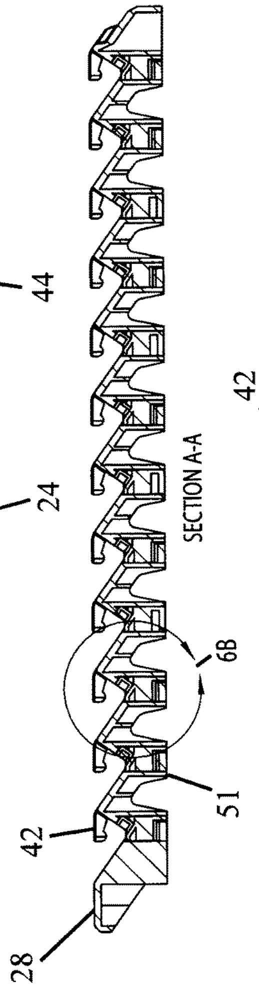
FIG. 6A is a cross-section of the wrench holder of FIG. 6 taken along lines 6A-6A.
Figure 6B:
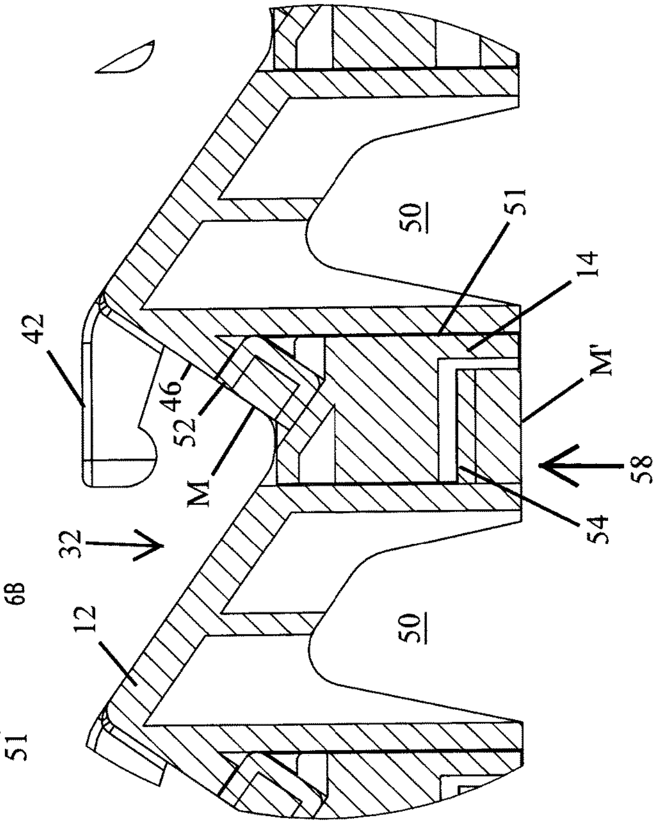
FIG. 6B is an enlarged view of section 6B in FIG. 6A.
Figure 7:
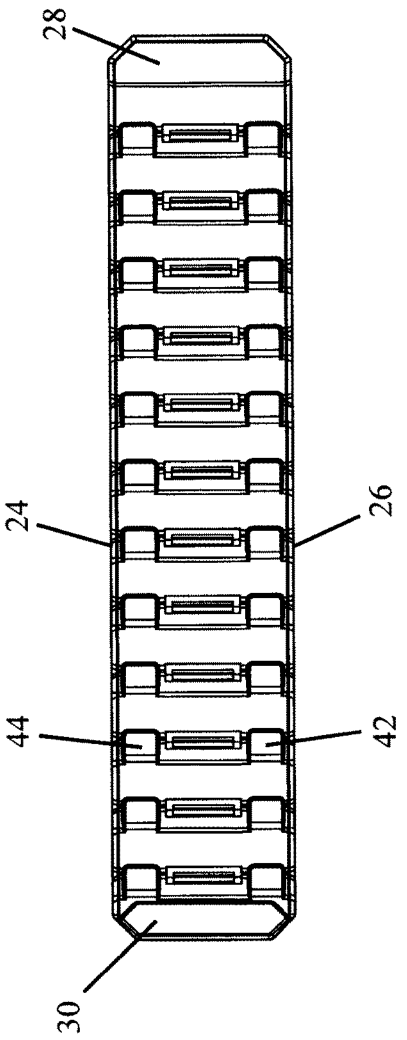
FIG. 7 is another top view of the wrench holder of FIG. 3.
Figure 7B:
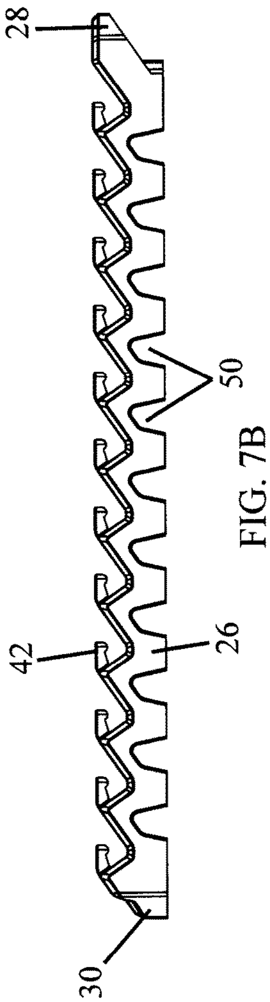
FIG. 7B is a side view of the wrench holder of FIG. 7.
Figure 7C:
FIG. 7C is a first end view of the wrench holder of FIG. 7.
Figure 7A:
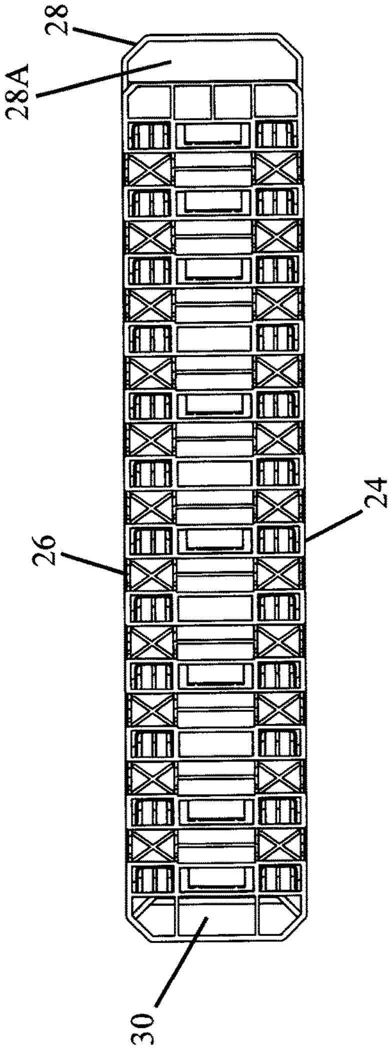
FIG. 7A is a bottom view of the wrench holder of FIG. 7.
Figure 8:
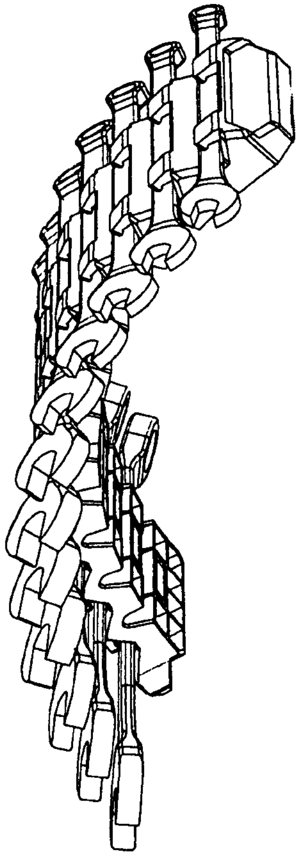
FIG. 8 shows the wrench holder of FIG. 1 in a flex position.
Figure 8A:
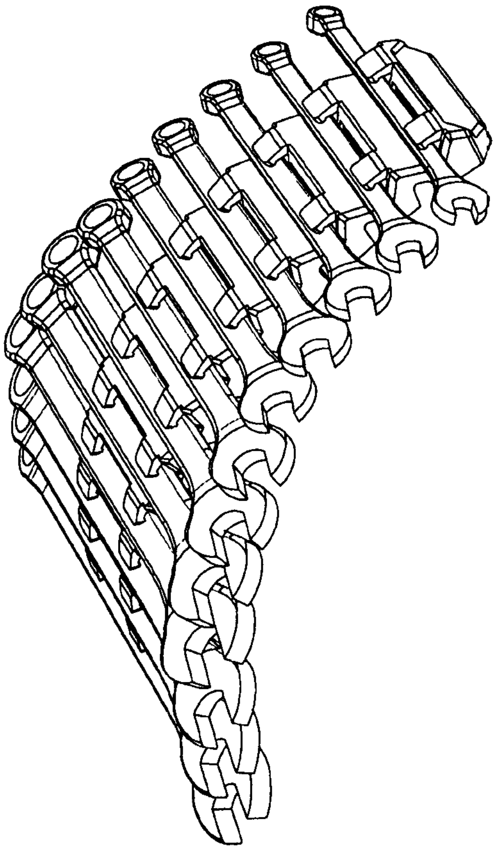
FIG. 8A is a similar view of FIG. 8.
Figure 9A:
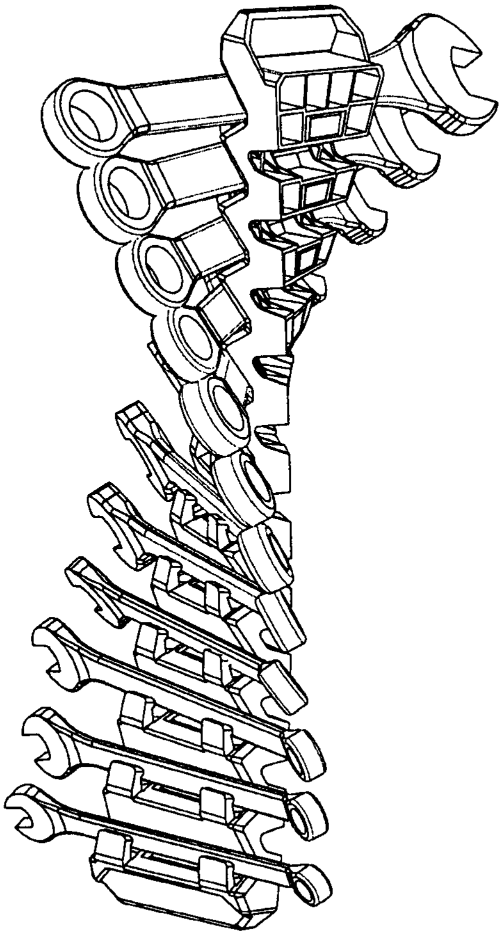
FIG. 9A is a similar view of FIG. 9.
Figure 9:
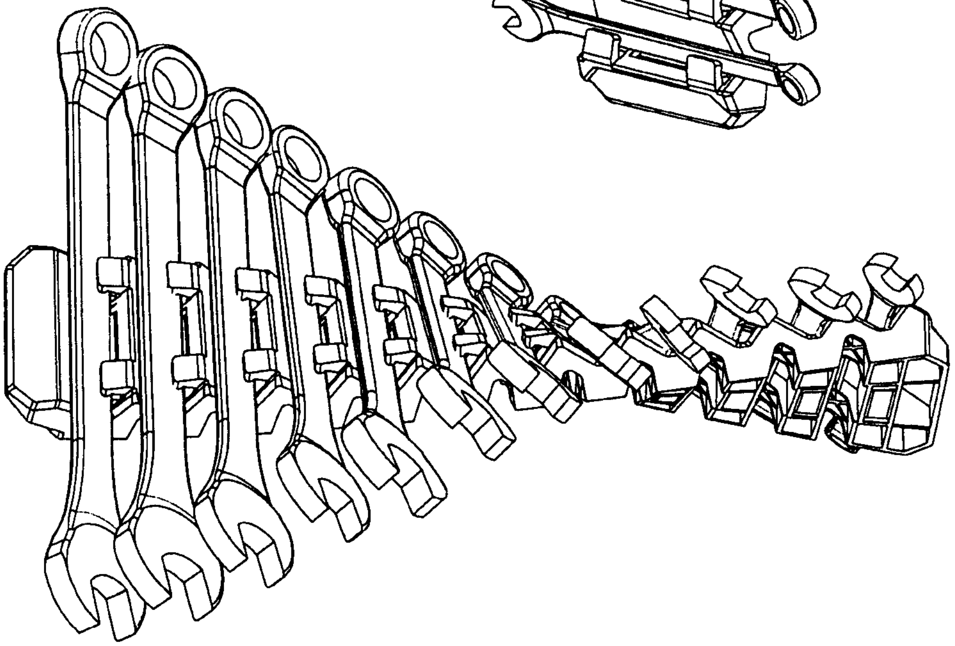
FIG. 9 shows the wrench holder of FIG. 1 in a twisted and flex position.

Referring to FIGS. 1-11, there is shown a wrench holder 10. Holder 10 includes a flexible strip 12 and a magnet retainer assembly 14. The strip 12 includes a top wall or surface 20, bottom wall or surface 22, first side wall 24, second side wall 26, first end wall 28 and second end wall 30. The top wall 20 includes a plurality of stations 32 for receiving a wrench W. In a preferred embodiment, there are twelve stations 32, although the number of stations may vary without departing from the scope of the invention. Each station 32 includes a grip 40 for holding a wrench. Grip 40 includes fingers 42 and 44 and slanted or tapered wall 46 with opening 48 for exposing a magnet M. Magnet M in the grip 40 will hold the wrench in the wrench holder. The magnet M is preferably flush with the surface of wall 46. The magnet M is preferably rectangular in shape and a neodymium magnet. The strength of the magnet may vary depending primarily on the size of the wrench. The magnet strength can be adjusted to the needs of the user but must be sufficiently strong to keep the wrenches in place. It is understood that the magnet does not need to be exposed for the holder to function. Each side wall 24,26 and bottom wall 22 provides for an archway 50 in the side walls for allowing the holder to flex. Each station 32 between side wall 24,26 and at bottom wall 22 includes a cavity 51 for receiving the magnet retainer assembly 14 as shown, for example, in FIGS. 6A, 6B and 10.

The first end wall 28 includes a cavity 28A on its underside for gripping and carrying the wrench holder.

Figure 10:
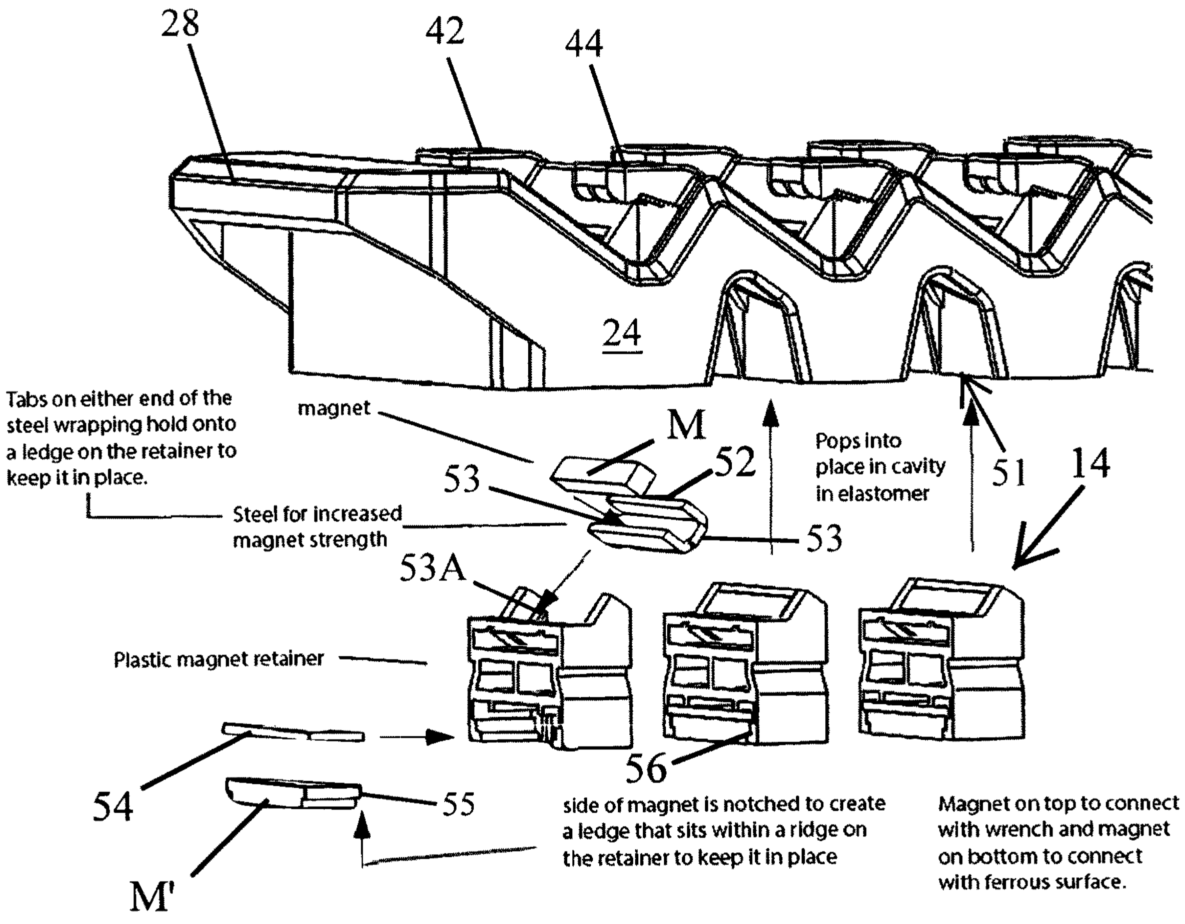
FIG. 10 is a partially exploded view showing a presently preferred embodiment of the wrench holder of FIG. 1 using a plastic magnet retainer assembly which receives the first and second magnets and which is inserted into a cavity of the elongated strip.
Figure 12:
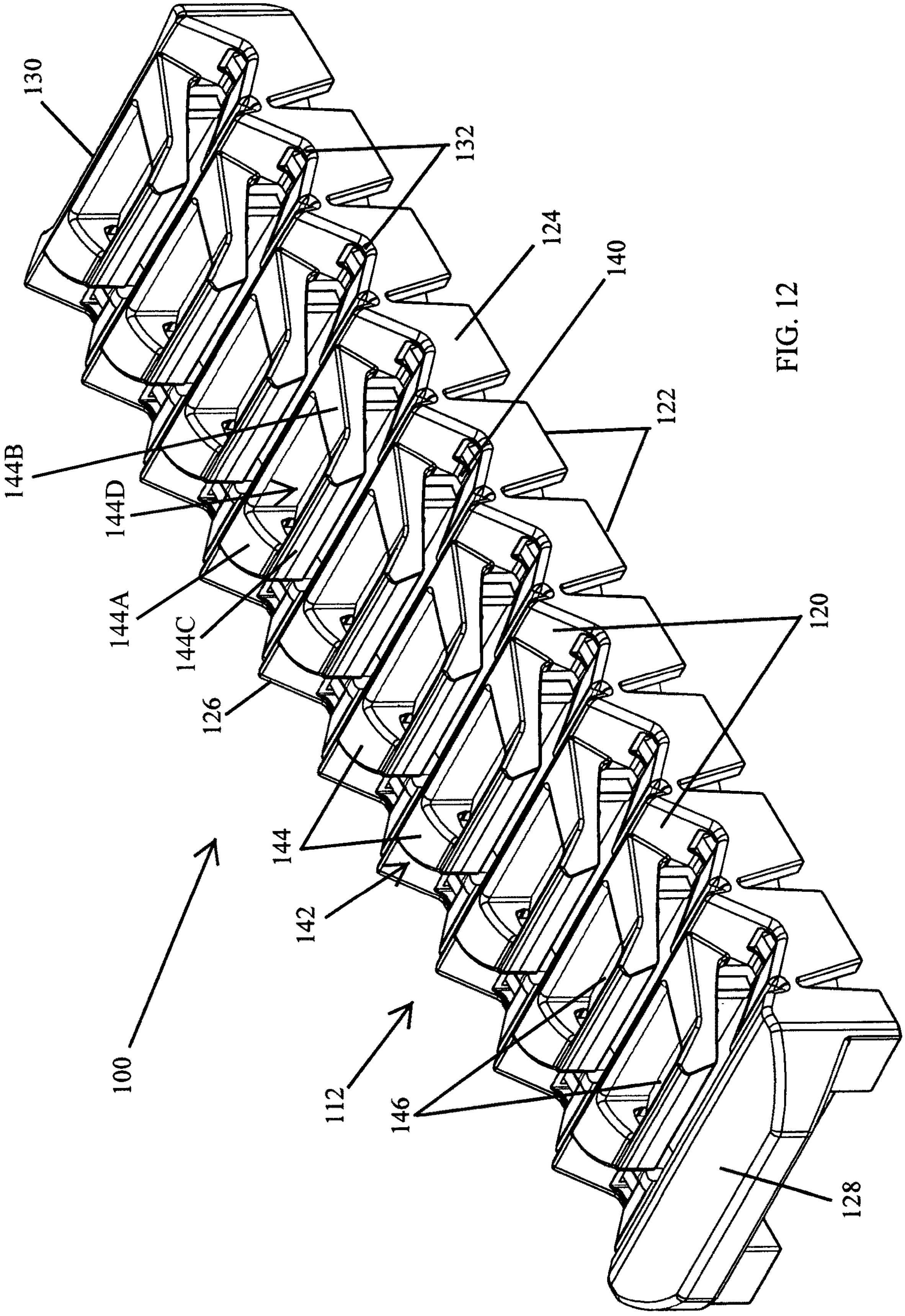
FIG. 12 is a perspective view of a second embodiment of the wrench holder invention with all of the wrenches removed.
Figure 13:
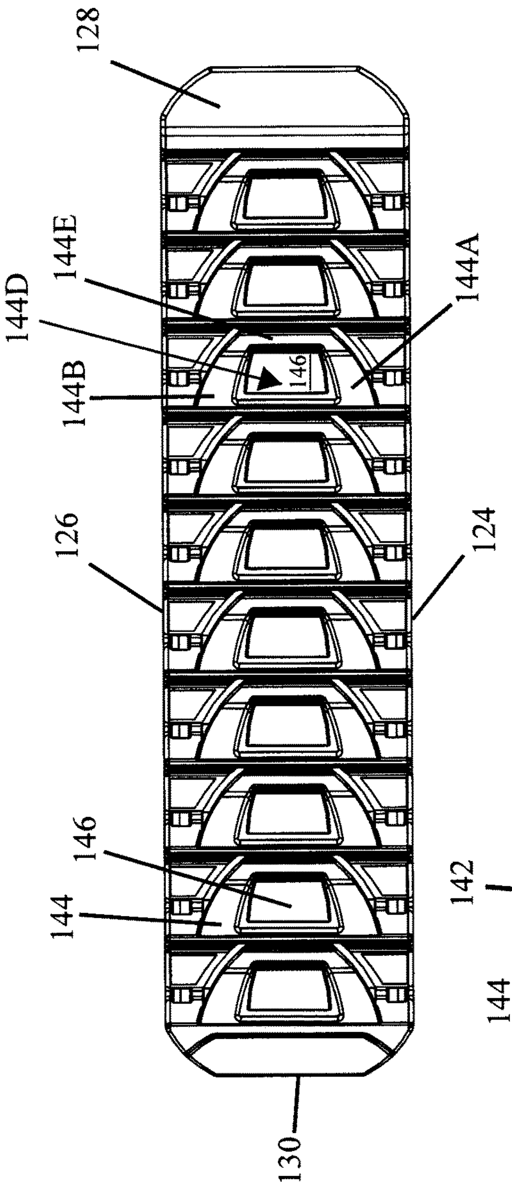
FIG. 13 is a top view of the wrench holder of FIG. 12.
Figure 14:
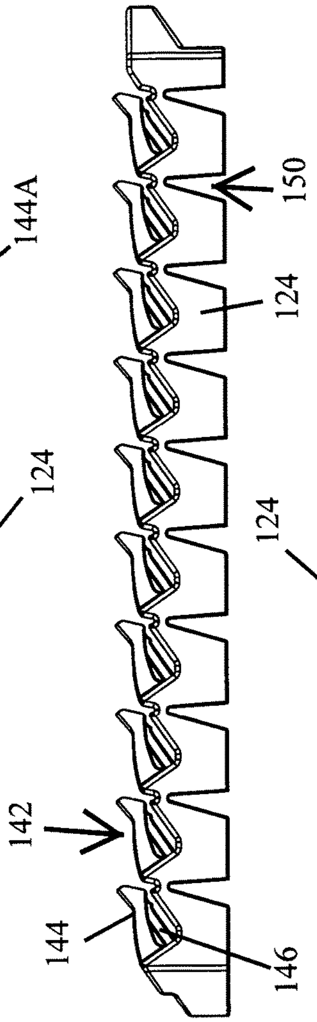
FIG. 14 is a side view of the wrench holder of FIG. 12.

The magnetic retainer assembly 14 is preferably made of plastic and holds magnets M and M'. Referring to FIGS. 10, 11 and 11A, plastic magnetic retainer 14 is shown in detail. There is a magnet M and a steel magnet holder 52 for receiving magnet M. Magnet M is preferably held by friction fit. In the alternative, the magnet is kept in the wrapped steel magnet holder 52 by having the wrapped steel magnet holder squeezed by a press after the magnet is placed into the magnet holder. There are tabs 53 on either end of the magnet holder 52 to hold the magnet in place on a corresponding ledge 53A of retainer 14. Magnet M' is held adjacent to a steel magnet holder 54. The side of the magnet M' is notched to create a ledge 55 that sits within a ridge 56 of retainer 14 to keep it in place. The retainer 14 is popped into place in the cavity 51 in the strip 12. There is an opening 58 for exposing magnet M'. Other means may be used to hold the magnet M' in place without departing from the scope of the invention. For example, instead of a notch in the magnets to hold them in place, there may be a holder similar to magnet holder 52.

The strip 12 and retainer 14 are preferably made by injection molding. Strip 12 is preferably TPR or silicone, although other similar materials may be used. Retainer 14 is preferably ABS plastic (acrylonitrile butadiene styrene).

A second embodiment of the invention is directed to a wrench holder for holding wrenches as shown in FIGS. 12-20. The wrench holder is made of a flexible material such as thermoplastic rubber (TPR) or silicone and having a structure such that the wrench holder may flex and bend for attachment of the wrench holder to almost any shape article. The wrench holder includes a plurality of flexible tabs which will hold the wrenches to the top of the wrench holder and a series of magnets which allow the bottom of the wrench holder to magnetically adhere to different shaped ferrous objects, e.g. an automobile wheel well, the underside of an automobile hood, a work area or any other article. The wrench holder may be made of different sizes for holding different size wrenches. The figures show a presently preferred embodiment of the wrench holder for holding ten different size wrenches. The invention will be described in further detail below.

Referring to FIGS. 12-22, there is shown a wrench holder 100. Holder 100 includes a flexible strip 112 and a magnet retainer assembly 114. The strip 112 includes a top wall or surface 120, bottom wall or surface 122, first side wall 124, second side wall 126, first end wall 128 and second end wall 130. The top wall 120 includes a plurality of stations 132 for receiving a wrench (not shown). In a preferred embodiment, there are ten stations 132, although the number of stations may vary without departing from the scope of the invention. Each station 132 includes a slot 140 and flexible tab 142 for holding a wrench by mechanical hold and friction. Tab 142 includes a main tab 144 having legs 144A and 144B extending from top wall 120 and cross member 144C providing for an opening 144D. There is an inner and smaller tab 146 extending downwardly from cross member 144C. The main tab 144 grips larger wrench handles and the smaller inner tab 146 grips smaller wrench handles. In addition to tabs 144 and 146, the top surface 120 may include glossy surfaces 148 which is an elastomer material which provides some added friction to help hold the wrenches in place. Similarly, the underside of tab 146 may include a glossy surface 148A for the same purpose.

Figure 15:
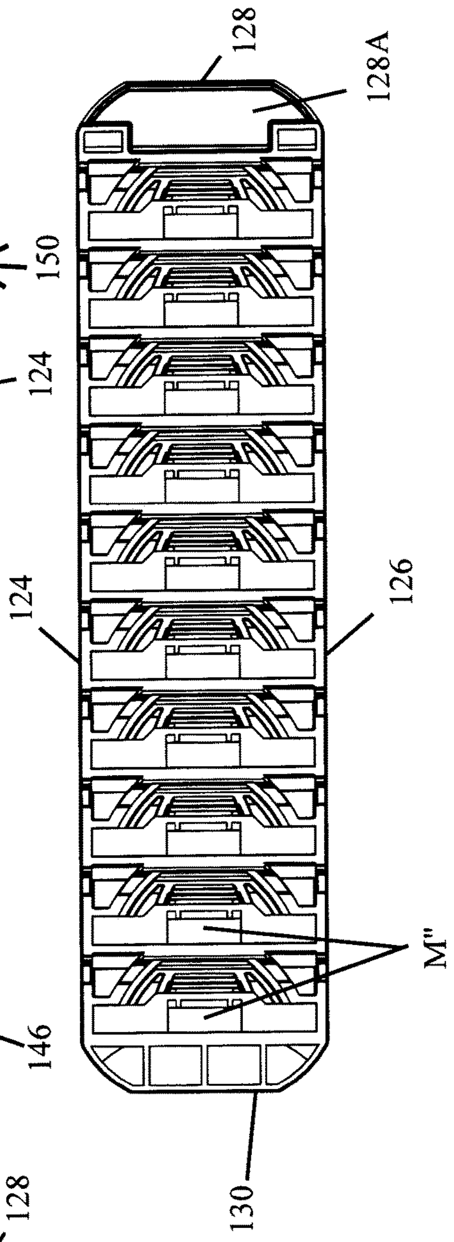
FIG. 15 is a bottom view of the wrench holder of FIG. 12.
Figure 16:
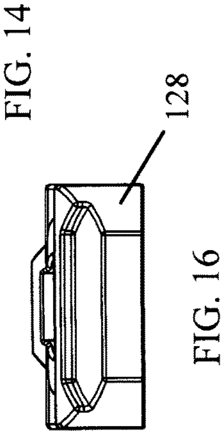
FIG. 16 is a first end view of the wrench holder of FIG. 12.
Figures 17, 17A, 17B:
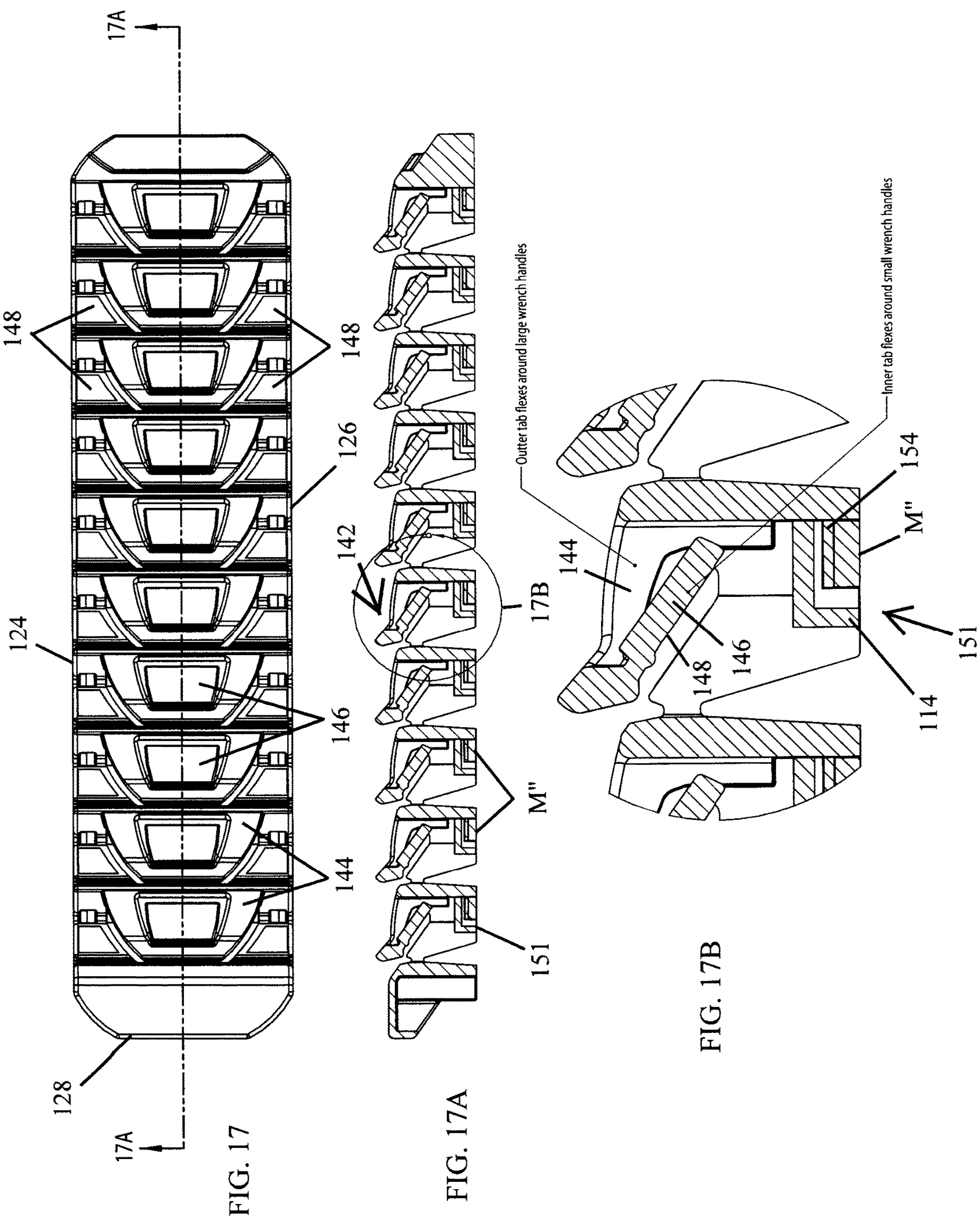
FIG. 17 is another top view of the wrench holder of FIG. 12.
FIG. 17A is a cross-section of the wrench holder of FIG. 17 taken along lines 17A-17A.
FIG. 17B is an enlarged view of section 17B in FIG. 17A.
Figure 18:
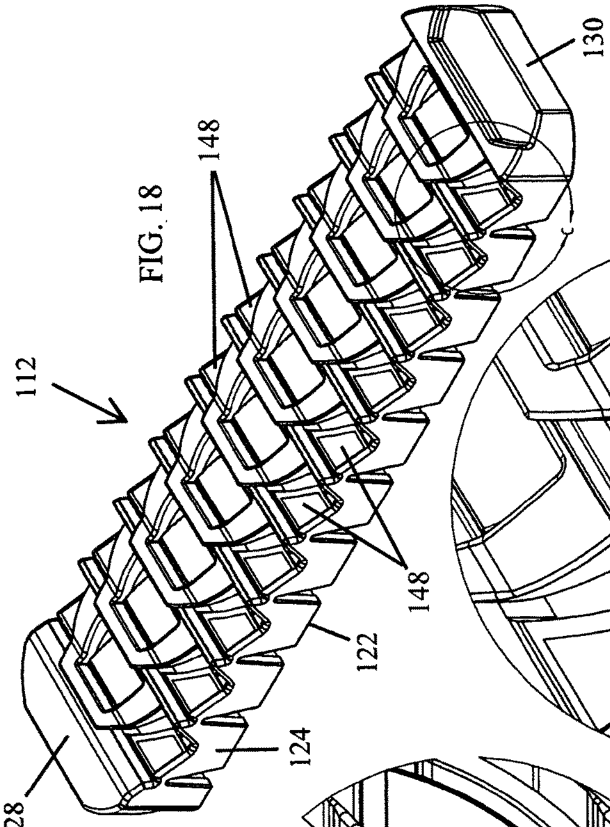
FIG. 18 is a top perspective view of the wrench holder of FIG. 12.
Figure 18C:
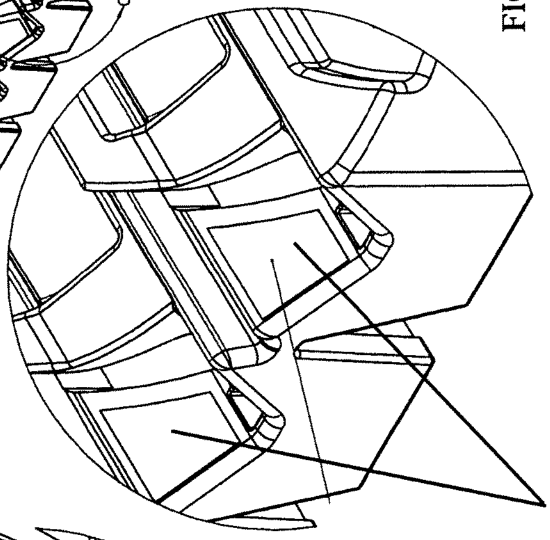
FIG. 18C is an enlarged view of area C of FIG. 18A.
Figure 18B:
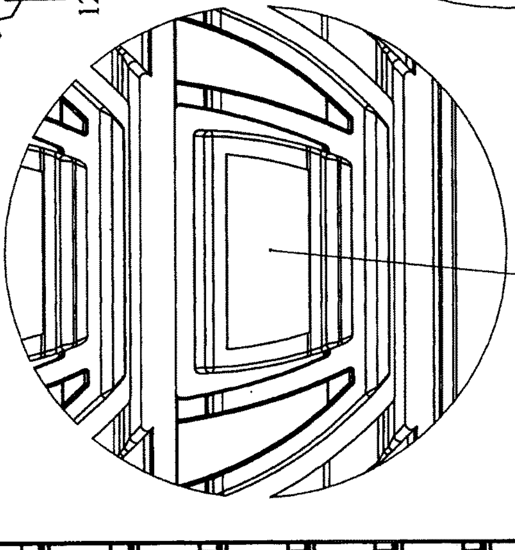
FIG. 18B is an enlarged view of area D of FIG. 18A.
Figure 18A:
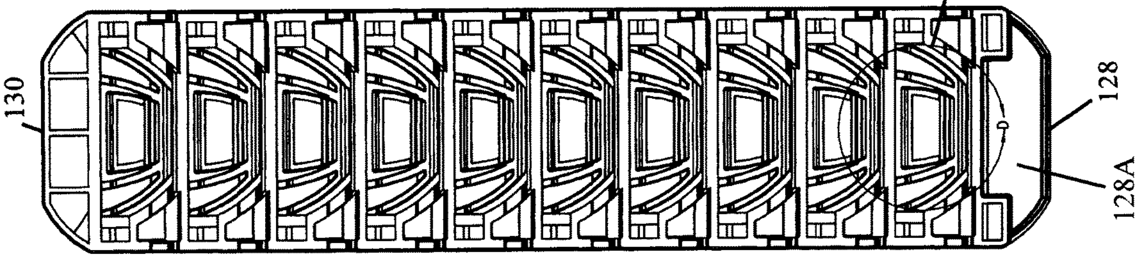
FIG. 18A is a bottom view of the wrench holder of FIG. 18.
Figure 19:
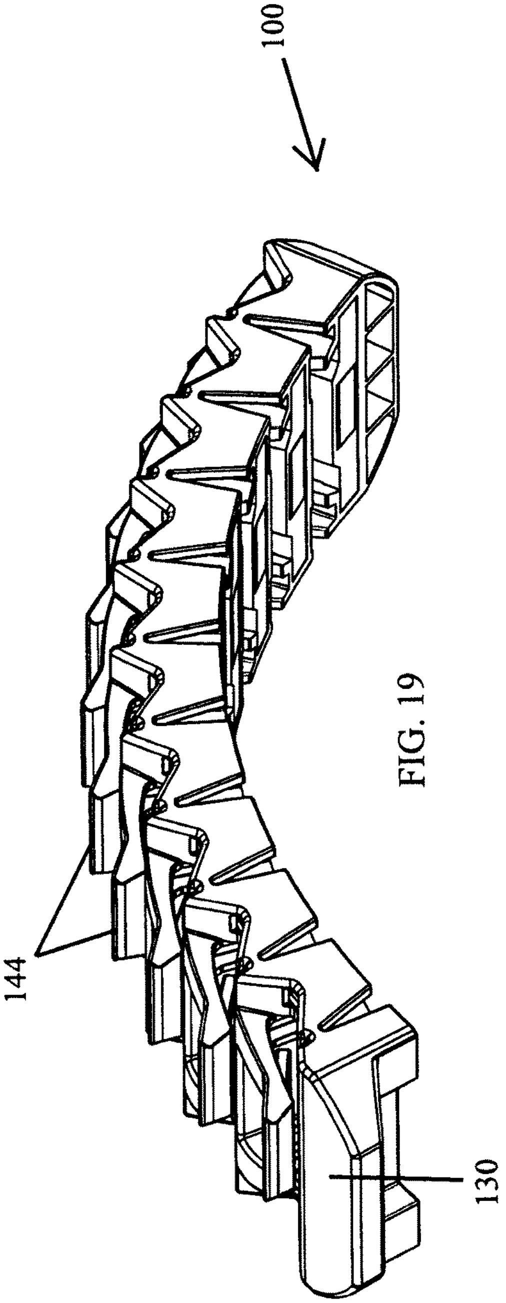
FIG. 19 shows the wrench holder of FIG. 12 in a flex position.
Figure 20:
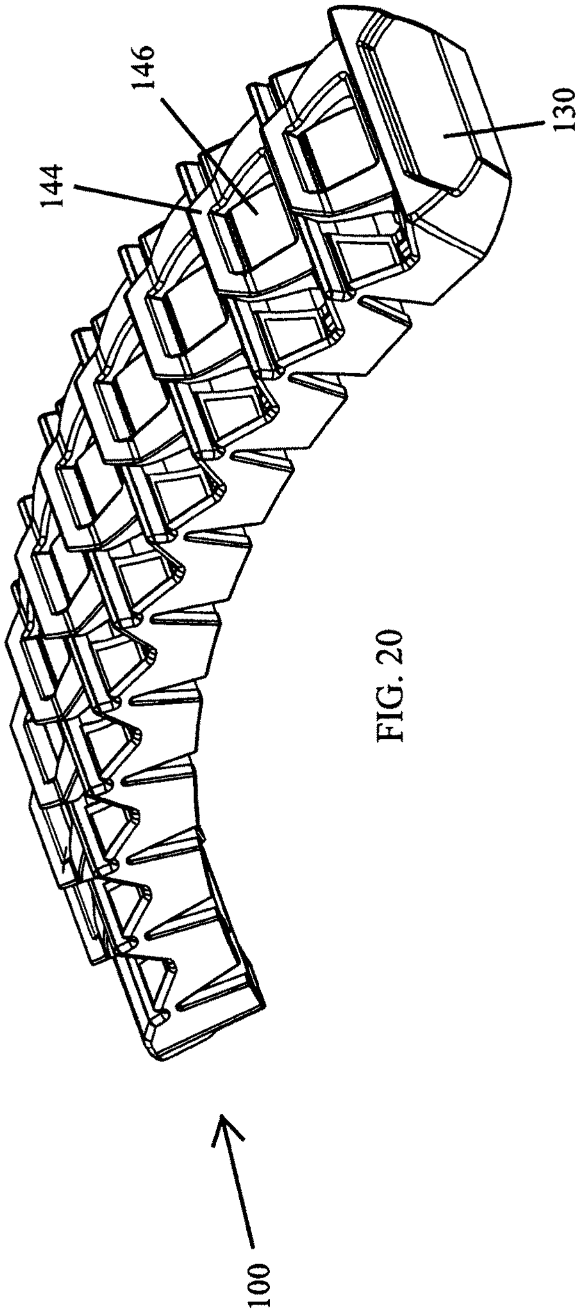
FIG. 20 is a view similar to FIG. 19.

Referring to FIGS. 15, 17A and 17B, the bottom wall or surface 122, includes a magnet M" at each station. The magnet M" will hold the wrench holder 100 to almost any magnetic surface. The magnet M" is preferably rectangular in shape and a neodymium magnet. The strength of the magnet may vary depending primarily on the surface to be attached to. Each side wall 124,126 and bottom wall 122 provides for an archway 150 in the side walls for allowing the holder to flex. Each station 132 between side wall 124,126 and at the bottom wall 122 includes a cavity 151 for receiving a magnetic retainer 114 as shown, for example, in FIGS. 17A, 17B, 21 and 22.

The first end wall 128 includes a cavity 128A on its underside for gripping and carrying the wrench holder.

Figure 21:
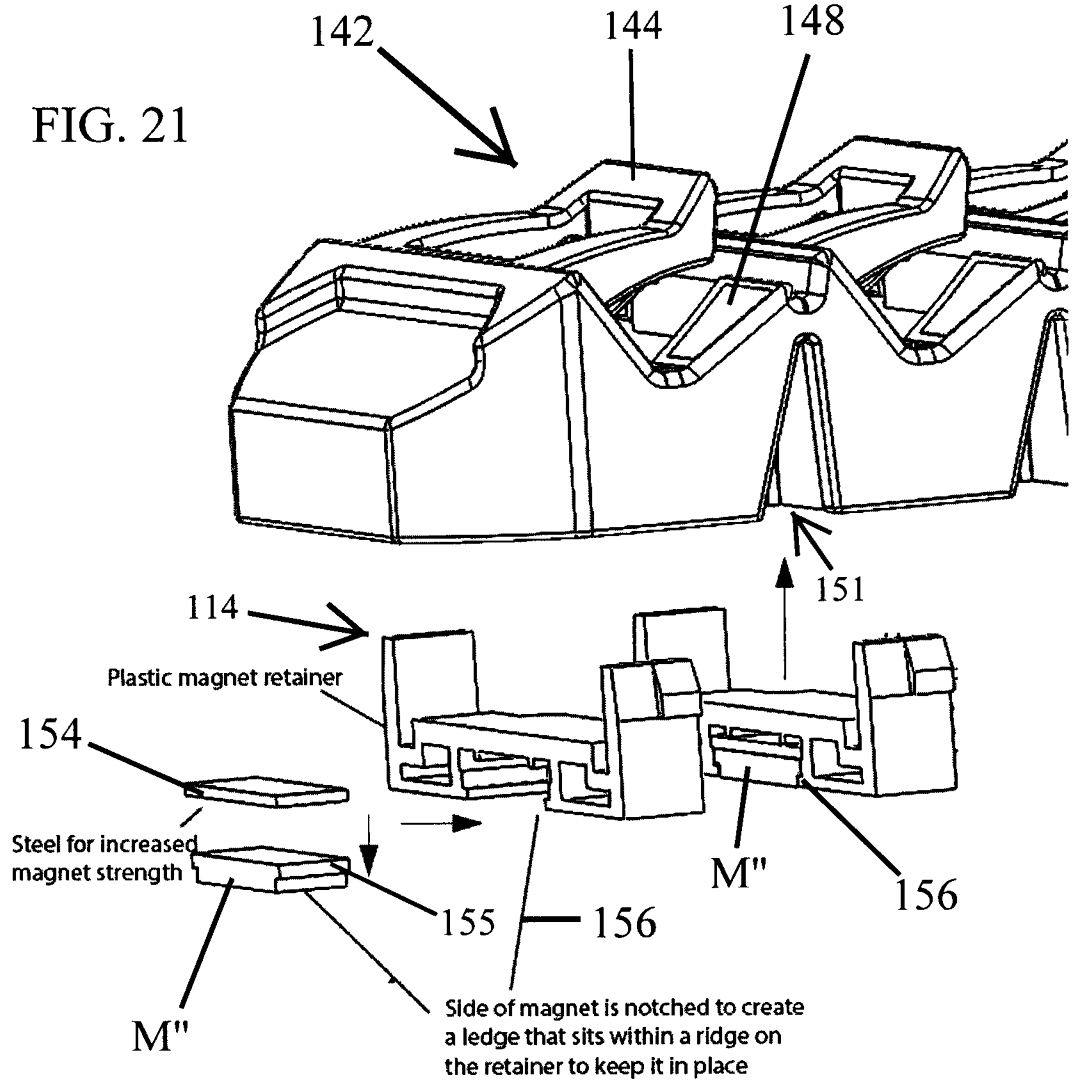
FIG. 21 is a partially exploded view showing a presently preferred embodiment of the wrench holder of FIG. 12 using a plastic magnet retainer assembly which receives the magnet and which is inserted into a cavity of the elongated strip.

The magnetic retainer 114 holds the magnet M". Retainer 114 is preferably made of plastic. The magnetic retainer is similar to that shown in FIGS. 10, 11 and 11A for holding magnet M'. Referring to FIGS. 21, 22 and 22A, plastic magnetic retainer 114 is shown in detail. There is a magnet M" which is held adjacent to a steel magnet holder 154. Magnet M" is notched to create a ledge 155 that sits within a ridge 156. The retainer 114 is popped into place in the cavity 151 in the strip 112. There is an opening 158 for exposing the magnet M".

The strip 112 is preferably made by injection molding. Strip 112 is preferably TPR or silicone, although similar materials may be used. Retainer 114 is preferably ABS plastic (acrylonitrile butadiene styrene)

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. For example, while the preferred embodiments are to have the magnet exposed at least in part in the magnet retainer assembly, the magnets may be covered by a layer of material. Such modifications being within the ability of one skilled in the art form a part of the present invention and are embraced by the appended claims.

It is claimed:

1. A flexible magnetic wrench holder comprising
a flexible elongated strip having a top wall, a bottom wall, a first side wall and a second side wall,
the first side wall, the second side wall and the bottom wall form an archway in the first side wall and in the second side wall,
the top wall having a plurality of stations, each station having a grip adapted to hold a wrench,
each station having a retainer for holding a first magnet adjacent the top wall of the flexible elongated strip and a second magnet adjacent the bottom wall of the flexible elongated strip,
wherein the grip of top wall of the flexible elongated strip and the first magnet are adapted to magnetically hold a wrench at the station and the second magnet adjacent the bottom wall of the flexible elongated strip is adapted to magnetically attach the holder to different shaped metal surfaces, and
wherein the flexible elongated strip is adapted to flex.

2. The flexible magnetic wrench holder of claim 1 wherein the flexible elongated strip is made of thermoplastic rubber or silicone and the retainer is made of plastic.

3. The flexible magnetic wrench holder of claim 1 wherein there is an opening in the top wall exposing the magnet.

4. The flexible magnetic wrench holder of claim 1 wherein there is an opening in the bottom wall exposing the magnet.

5. The flexible magnetic wrench holder of claim 2 wherein the plastic retainer includes a first metal magnet holder retaining the first magnet flush with a slanted wall of the top wall and a second metal magnet holder retaining the second magnet flush with the bottom wall.

6. The flexible magnetic wrench holder of claim 1 wherein the grip at each station comprises a first finger, a second finger and a slanted wall between the first finger and the second finger.

7. The flexible magnetic wrench holder of claim 1 wherein the flexible elongated strip includes an end wall having a cavity for grasping the holder.

8. The flexible magnetic wrench holder of claim 1 wherein the flexible elongated strip is made of thermoplastic rubber or silicone and the retainer is made of plastic, wherein there is an opening in the top wall exposing the magnet and an opening in the bottom wall exposing the magnet, wherein the plastic retainer includes a first metal magnet holder retaining the first magnet flush with a slanted wall of the top wall and a second metal magnet holder retaining the second magnet flush with the bottom wall, and wherein the grip at each station comprises a first finger, a second finger and a slanted wall between the first finger and the second finger.

9. A flexible magnetic wrench holder comprising
a flexible elongated strip having a top wall, a bottom wall, a first side wall and a second side wall, the first side wall, the second side wall and the bottom wall form an archway in the first side wall and in the second side wall, the top wall having a plurality of stations, each station having a flexible tab adapted to hold a wrench, each station includes a retainer for holding a magnet adjacent the bottom wall of the flexible elongated strip, wherein the bottom wall and the magnet of the flexible elongated strip are adapted to magnetically attach the holder to different shaped metal surfaces, and wherein the flexible elongated strip is adapted to flex.

10. The flexible magnetic wrench holder of claim 9 wherein the flexible elongated strip is made of thermoplastic rubber or silicone and the retainer is made of plastic.

11. The flexible magnetic wrench holder of claim 9 wherein there is an opening in the bottom wall exposing the magnet.

12. The flexible magnetic wrench holder of claim 2 wherein the plastic retainer includes a metal magnet holder retaining the magnet flush with the bottom wall.

13. The flexible magnetic wrench holder of claim 9 wherein the flexible tab comprises a main tab adapted to retain larger wrenches and a smaller inner tab connected to said main tab and adapted to retain smaller wrenches.

14. The flexible magnetic wrench holder of claim 13 wherein the main tab comprises a first leg extending from the top wall, a second leg extending from the top wall and a cross member connecting the first and second legs and the smaller inner tab extends downwardly from the cross member.

15. The flexible magnetic wrench holder of claim 9 wherein the flexible elongated strip includes an end wall having a cavity for grasping the holder.

16. The flexible magnetic wrench holder of claim 9 wherein the flexible elongated strip is made of thermoplastic rubber or silicone and the retainer is made of plastic, wherein there is an opening in the bottom wall exposing the magnet, wherein the plastic retainer includes a metal magnet holder retaining the magnet flush with the bottom wall, and wherein the flexible tab comprises a main tab adapted to retain larger wrenches and a smaller inner tab connected to said main tab and adapted to retain smaller wrenches.

17. The flexible magnetic wrench holder of claim 16 wherein the main tab comprises a first leg extending from the top wall, a second leg extending from the top wall and a cross member connecting the first and second legs and the smaller inner tab extends downwardly from the cross member.

* * * * *